United States Patent [19]

Walker et al.

[11] Patent Number: 4,945,749
[45] Date of Patent: Aug. 7, 1990

[54] COLD FORMING DIES AND COLD FORMING PROCESS

[75] Inventors: Billy R. Walker, Daleville; George B. Emmons, Chesterfield; Robert E. Dean, Yorktown, all of Ind.

[73] Assignee: General Motors Corporation, Detroit, Mich.

[21] Appl. No.: 429,929

[22] Filed: Oct. 30, 1989

[51] Int. Cl.[5] .................... B21D 45/02; B21K 21/10
[52] U.S. Cl. ........................................ 72/356; 72/344; 72/359
[58] Field of Search .................. 72/344, 353, 354, 356, 72/358, 359

[56] References Cited

U.S. PATENT DOCUMENTS

| | | | |
|---|---|---|---|
| 3,096,579 | 7/1963 | Waller | 72/354 |
| 3,101,534 | 8/1963 | Lange | 72/361 |
| 3,186,209 | 6/1965 | Friedman | 72/356 |
| 3,280,613 | 10/1966 | Schrom | 72/359 |
| 3,835,686 | 9/1974 | Lawson | 72/354 |
| 4,166,373 | 9/1979 | Braun | 72/356 |
| 4,177,665 | 12/1979 | Schurmann | 72/359 |
| 4,291,568 | 9/1981 | Stifano | 72/358 |
| 4,352,283 | 10/1982 | Bailey | 72/358 |
| 4,416,141 | 11/1983 | Nippert | 72/356 |
| 4,422,236 | 12/1983 | Ware, Jr. et al. | 29/876 |
| 4,423,617 | 1/1984 | Nippert | 72/356 |
| 4,580,431 | 4/1986 | Oku et al. | 72/359 |
| 4,776,197 | 10/1988 | Scott | 72/358 |

FOREIGN PATENT DOCUMENTS 1323165  7/1987  U.S.S.R. ............................. 72/344

OTHER PUBLICATIONS

European Patent Application No. 0117213; published on Aug. 1984; Inventor: Bostbarge.
U. K. Patent Application No. 2,141,654A, 1985; Inventor: Heminger et al.

Primary Examiner—Robert L. Spruill
Attorney, Agent, or Firm—Lawrence B. Plant

[57] ABSTRACT

Progressive step and compound dies are employed in a cold working process to form a metallic preform of selected mass into a precision-finished, pore-free, annular bushing with a mass substantially equal to that of the preform for use as a battery terminal which allows the fracture free spin over connection of the stem of the bushing to a battery cover and the close fit of the bushing on the battery post when the cover is fitted to the battery casing.

7 Claims, 7 Drawing Sheets

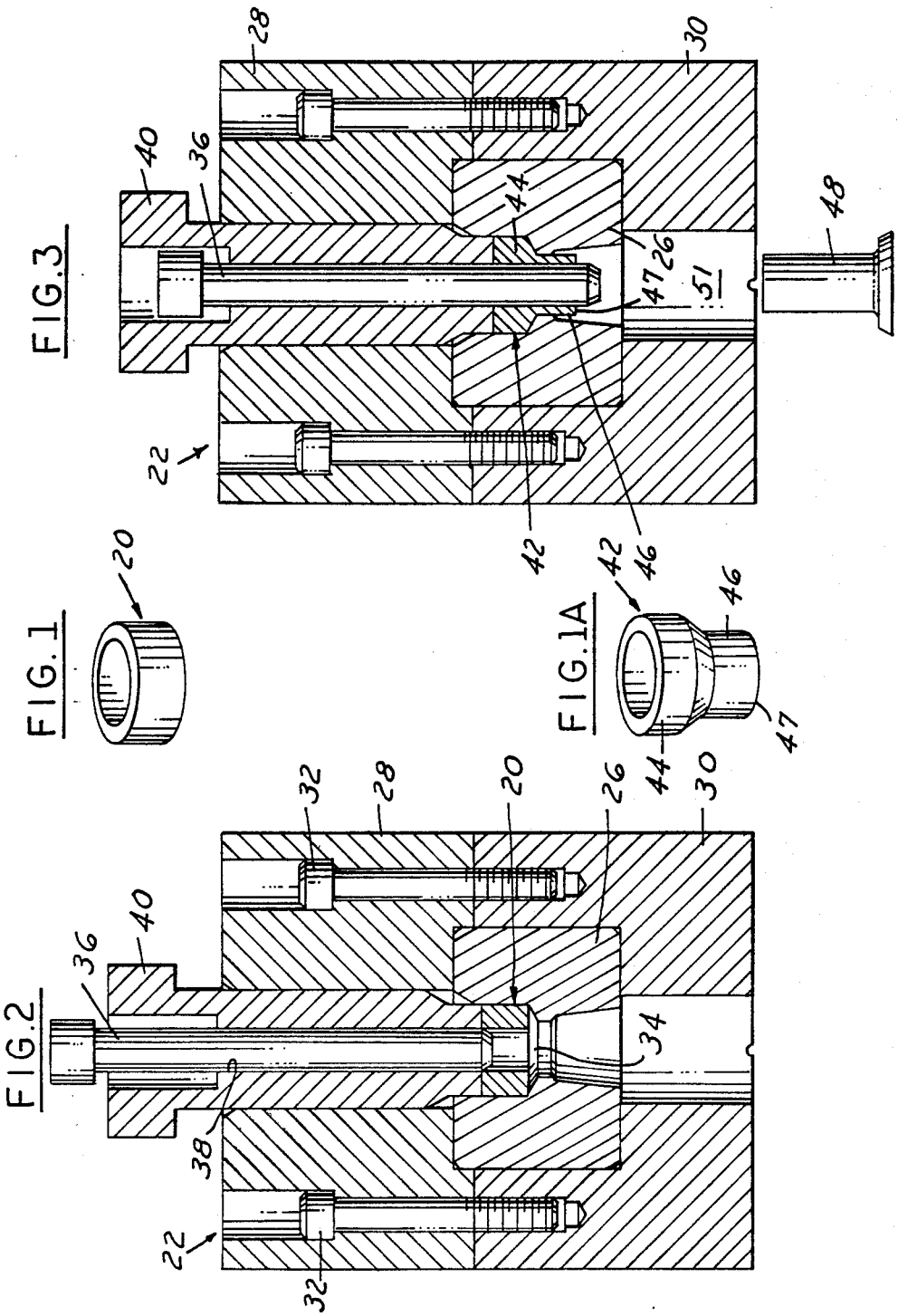

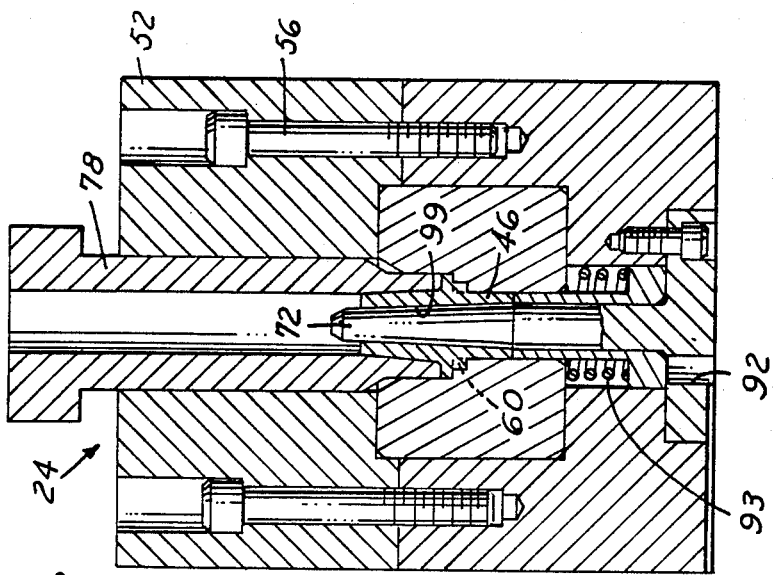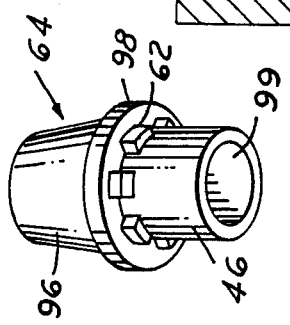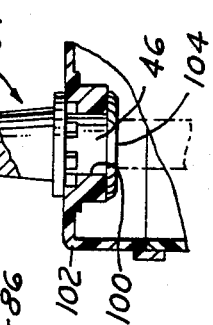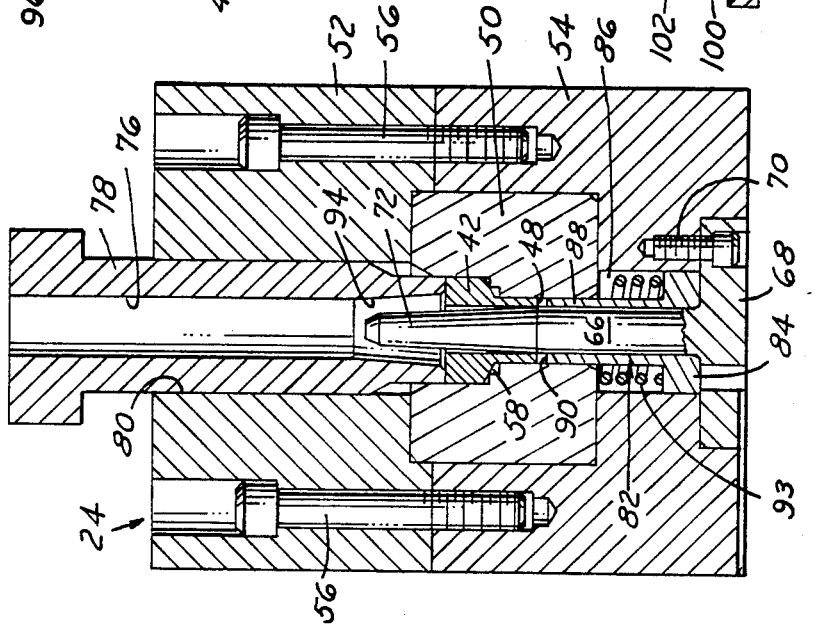

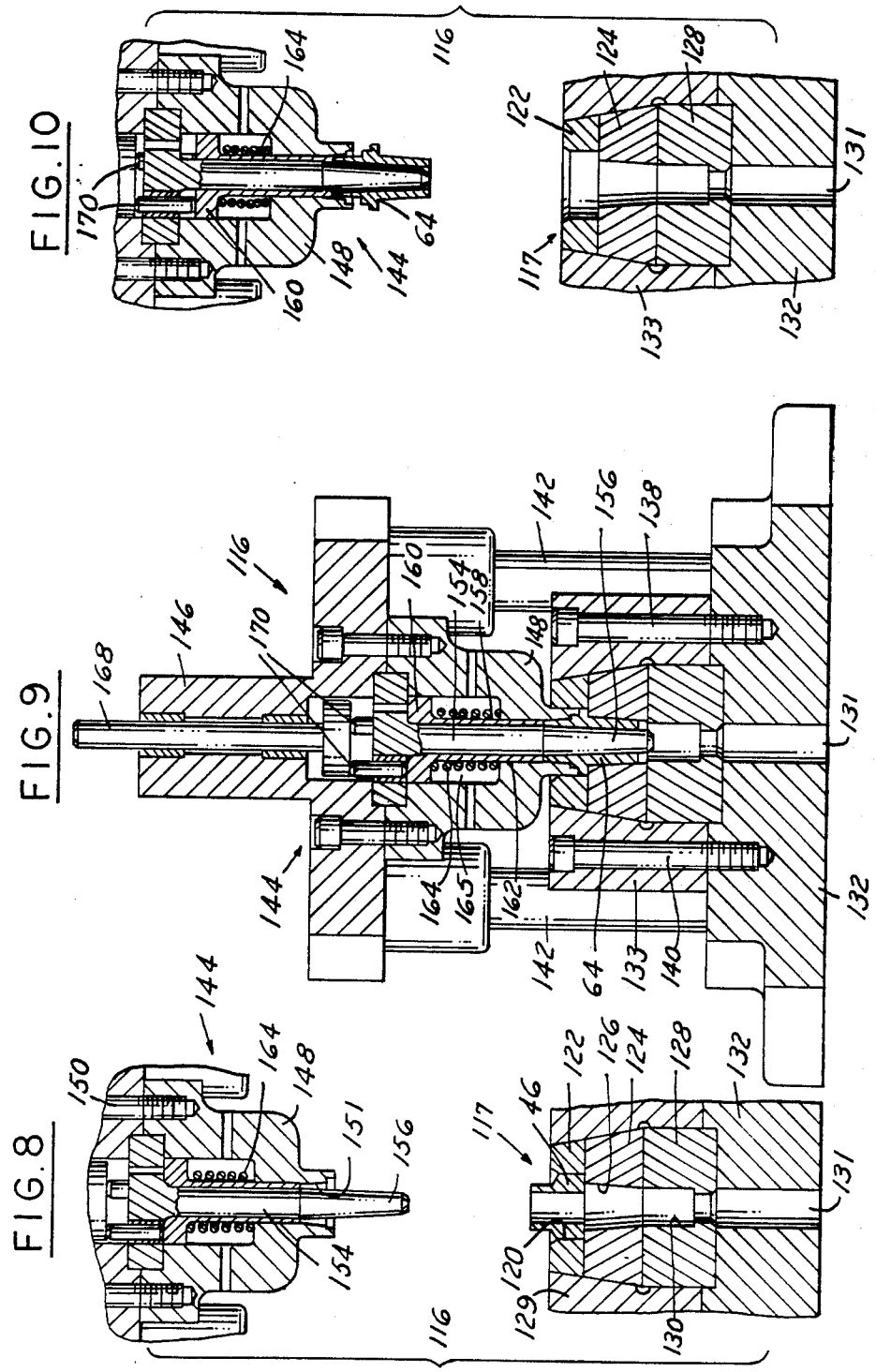

COLD FORMING DIES AND COLD FORMING PROCESS

TECHNICAL FIELD

This invention relates to the cold forming of a metallic preform of predetermined mass into a finished article of predetermined specifications and more particularly to a new and improved process for cold forming a finished metallic bushing for a battery terminal effectively utilizing all of the material of the preform and to new and improved die construction for cold forming bushings.

BACKGROUND OF THE DISCLOSURE

Prior to the present invention, lead alloy battery terminal bushings have been mass produced by die casting with good success However, porosity occurring in some of these bushings caused faults in their stem portions which may fracture as the stem is spun riveted over when the battery cover and bushing are assembled together This results in rejection of such assembled parts adding to battery costs for recycling or remanufacture. Furthermore, in some die cast bushings, gases trapped in voids or pores in the metal cause splattering, poor fusion and poor weld penetration during the inert gas welding operation generally used to join the external bushing to the cell post to form the finished terminal. Finished terminals made with cast bushings may also have blackened cable attachment towers caused by electrolyte leaching through the pores in the bushing. This terminal discoloration is objectionable since it detracts from battery appearance and purchaser acceptance.

In addition to die cast bushings, extruded or cold formed bushings and solid terminals have been utilized or proposed prior to the present invention. For example, in U.S. Pat. No. 4,422,236 a method of extruding solid terminals for batteries is disclosed in which the terminal is formed by extrusion and a fixture of harder material is concurrently captured within the body of the terminal. In European patent application No. 0261311, a process for cold forming battery terminal bushings is disclosed in which a solid blank is pierced, cold formed and subsequently trimmed to size by removal of excess metal from opposite ends of the cold form.

The present invention relates to a process and apparatus for cold forming battery terminal bushings which advantageously utilizes substantially all of the material in a final preformed part (i.e., before cold forming) to provide a finished product that needs no trimming, cutting to size, or other finishing steps before being employed as a bushing for attachment to the battery cover and for subsequent close fitting on the battery terminal post.

The initial preform for the bushing of this invention is made from a blank of lead, lead alloy, or other suitable material by any suitable method to provide an initial shape of specified dimensions and mass. For example, the initial preform may be of a specific mass, generally torodial or donut in shape having fixed height and fixed inner and outer diameters. After the donut shaped preform is completed, it is loaded in a first of two progressive cold forming die sets stroked to make a final preform with a cylindrical stem with fixed inner and outer diameters cold worked from the donut preform. This is accomplished by a ram and forming arbor which forwardly extrudes the cylindrical stem in the die closing operation. Subsequently, in a second die set, the completely finished bushing with a flange is formed midway between the stem and a cable connecting tower for mounting the bushing to the battery cover. This tower is simultaneously formed by reversely extruding a portion of the initial preform around the arbor and within the interior of a ram that applies an axial load to the preform. The arbor further cold forms the interior wall of the bushing and a tapered central opening through the bushing is provided. During this operation, anti-turn lugs adapted to fit into recesses in the battery cover are closed die forged on the underside of the mounting flange. With this second progressive die, the formation of the bushing is complete and is properly sized so that no trimming or further operation is needed to finish the bushing. With the cold forming, the porosity of the bushing is reduced to a minimal porosity so that the stem can be readily spun riveted to form the cover and bushing assembly without breakage or damage from pore weakened metal material. In the event that single step manufacture is desired, the present invention includes compound dies which unite the principle of reverse and forward extrusion with coining in one operation. The preferred embodiments of this invention determine prerequisite dimensional limits of the bushing and include ejector mechanisms which form a part of the wall of the die cavity and which are used to remove cold formed parts axially from the dies.

It is a feature, object and advantage of this invention to provide a new and improved process of precision cold forming and finishing metallic terminal bushings for batteries and the like which eliminates the finishing of the part after removal from the cold forming dies.

Another feature, object and advantage of this invention is to provide new and improved die constructions for making battery terminal components from metallic material which includes reverse extrusion of a portion of a preform while other portions are being coined and forwardly extruded.

These and other features, objects and advantages of this invention will be more apparent from the following detailed description and drawings in which:

DESCRIPTION OF THE DRAWINGS

FIG. 1 a pictorial view of a donut shaped preform for a battery terminal bushing to be cold formed therefrom.

FIG. 1A is a pictorial view of a final preform to be cold formed into a finished battery terminal bushing.

FIGS. 2 and 3 are sectional views of a first of progressive die sets before and after cold forming the preform part of FIG. 1 loaded therein.

FIGS. 4 and 5 sectional views of a second of progressive sets before and after cold forming the preform part of FIG. 1A produced by the die set of FIGS. 2 and 3.

FIG. 6 a pictorial view of the terminal bushing produced by the die set of FIGS. 4 and 5.

FIG. 7 is a cross-sectional view of a bushing of FIG. 6 as installed in a battery cover and onto a battery terminal post.

FIGS. 8, 9 and 10 are cross-sectional views of a compound die set illustrating cold forming of a blank into a compled bushing.

DETAILED DESCRIPTION OF THE DRAWINGS

Figure 11:
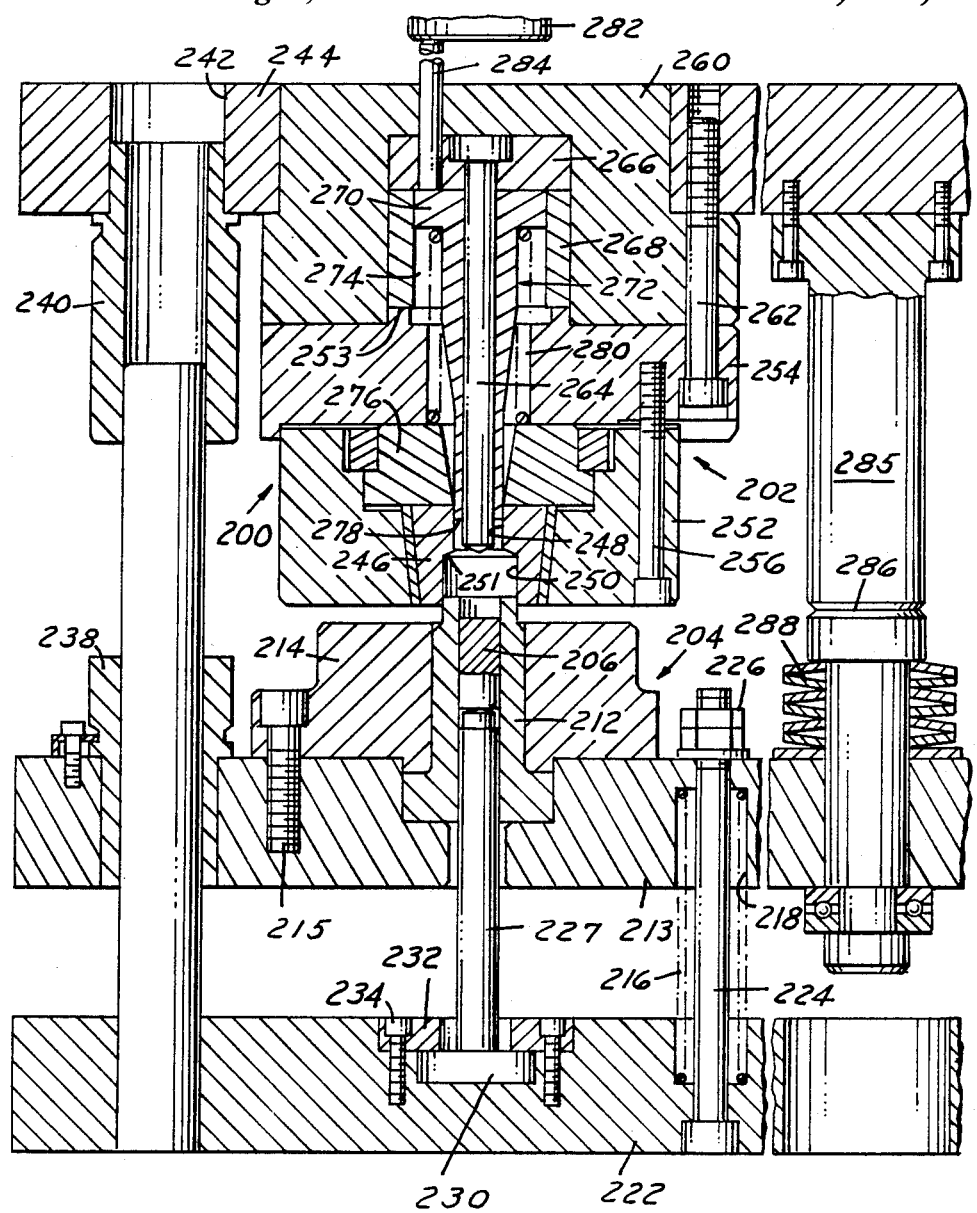
FIGS. 11, 12 and 13 are cross-sectional views of a compound die set for cold forming a stemmed preform from a cylindrical blank.

Turning now in greater detail to the drawings, there is shown in FIG. 1 a donut shaped preform 20 produced by cold forming or by another suitable process (e.g., extrusion) to have a predetermined mass and internal and external diameters.

This preform 20 is cold worked into a finished terminal bushing by a pair of progressive die sets 22 and 24 shown in FIGS. 2 through 5. The donut-shaped preform 20 is loaded in a forward extrusion die 26 of die set 22 which is operatively mounted in the cavity provided between upper and lower support blocks 28, 30 removably secured together by cap screws 32. The extrusion die 26 has an annular and shouldered die orifice 34 which, in conjunction with a cylindrical forming arbor 36 that strokes through the center bore 38 of a powered and downwardly stroking ram 40, produces a cold worked final preform element 42. This preform has substantially the same mass as the donut and is formed to have a cylindrical interior wall defining a fixed internal diameter. As shown in FIGS. 1A and 3, the preform has a cylindrical head 44, the lower surface of which tapers inwardly to a cylindrical stem 46 with terminal end 47. The preform element 42 is removed by ejector pin 48 through opening 51 in support block 30.

FIG. 4 shows the die set 24 having finishing die 50 secured in operative position within a recess in upper and lower support blocks 52, 54 fastened together by screws 56. The die 50 has a cylindrical stepped shouldered die orifice 58 therein which receives the preform 42 as cold formed by the die set 22. The shoulder of the die orifice has an annular arrangement of spaced teeth or castellations to form anti-turn lugs 62 on the otherwise flattened lower surface of the finished bushing 64 as best shown in FIG. 6.

The finishing die set 24 has a generally cylindrical forming arbor 66 upstanding from an enlarged base 68 secured to the lower support block 54 by screw 70. Arbor 66 has a tapered nose 72 projecting through the die orifice 58 and the cylindrical opening of preform 42 which has been loaded into the die set. As shown, the arbor nose extends into the center bore 76 of a ram 78 that is operatively mounted in bore 80 of the block 52. Supported on the base 54 is a vertically movable stop and part stripper 82 having a cylindrical head 84 mounted in a counter bore 86 and an elongated cylindrical stripper tube 88 which extends around arbor 66 into die orifice 58 to the lower end 47 of stem of the preform 42. The annular upper end 90 of the stripper tube forms a limit for the terminal end 47 of stem 46 of the cold formed bushing 64 as shown by FIG. 5. For removal of the bushing 64 from the die set 24, three rods (only one shown) or other actuator mechanism may be inserted through corresponding openings 92 in the arbor base 68 to move the stripper 82 upwardly against the force of spring 93 to axially displace the completed bushing 64 from the arbor and out of the finishing die when die set 24 is opened.

The ram 78 is operated by any power drive mechanism such as an eccentric drive or crank arm or a double acting hydraulic or pneumatic power cylinder to stroke the ram to the FIG. 5 position in which lugs 62 are formed by coining. A portion of the head 42 of the preform is reversely extruded into the conical upper half of the die cavity formed by the conical end opening 94 of ram 78 and the tapered upper nose 72 portion of the arbor to form tower 96 rising above the formed annular flange 98 extending radially in a principal plane to a fixed diameter. The inner wall 99 of the cold formed bushing 64 tapers inwardly from the stem to the tower to facilitate removal from the die set and during battery assembly to fit closely onto the battery terminal post which extends upwardly from the battery's cell elements and has a complimentary taper. The ram is axially removed from the die set and the lower end of the bushing is contacted by the stripper which, when moved upwardly, ejects the cold formed bushing 64 out of the forming dies through bore 80.

The ejected substantially pore-free lead alloy bushing 64 of FIG. 6 has the same mass as the initial and final preforms and require no additional sizing operations. The stem of this bushing is placed in an opening 100 in battery cover 102 notched to receive the locking lugs 62, and the lower end of stem 46 is subsequently spun over at 104 to secure the bushing to the cover as shown in FIG. 7. The bushing is then fitted on the correspondingly tapered battery terminal post 103 and these parts are welded together (i.e., at the tops of the post 103 and tower 96).

FIGS. 8, 9 and 10 disclose the bushing 64 being cold formed by compound die set 116 having lower die assembly 117. The preform 42 of FIG. 1A is supported by the lower die assembly on a seat defined by the cylindrical wall 120 of an uppermost die block 122 stacked on intermediate die block 124 that has a smaller diameter and a tapered annular forming wall 126. The block 124 in turn is stacked on a bottom die block 128 having an annular wall 130 that defines an access opening aligned with the orifices of die blocks 122 and 124 and an opening 131 in the bolster plate 132. The die blocks 122, 124 and 128 are mounted in the die block holder 133 which is secured to bolster plate 132 by screws 138, 140.

Mounted on guide posts 142, for vertical movement between open and closed position with respect to the lower die assembly 117, is an upper die assembly 144. The upper die assembly includes a press ram 146 secured to an upper punch shoe, not shown, and a punch 148 secured by screws 150 to the press ram. As illustrated by FIGS. 8, 9 and 10 the punch 148 has an internal annular die surface 151 shaped to form the stem 46 and anti-turn lugs 62 and the flattened lower surface of the flange 98 of the bushing 64 best shown in FIG. 6. An arbor 154 having a conical metal working nose 156 is rigidly held by the press ram 146 and strokes with the punch 148. Mounted for axial movement in the upper die shoe is a part stripper 158 having a large diameter abutment head 160 and a part stripper sleeve 162 depending downwardly therefrom that surrounds the cylindrical main body of arbor 154. Helical spring 164 trapped in the spring pocket 165 formed in punch 148 provides the force to urge the stripper to the upper position of FIGS. 8 and 9. The lower end of the stripper sleeve limits the flow of metal during cold forming to establish the end of stem 46 of the bushing.

In a cold forming operation, the preform 46 is loaded in the die set when opened as in FIG. 8. The upper die assembly is stroked under predetermined load to the closed position of FIG. 9. In this single stage cold forming operation, the punch 148 engages the tapered shoulder on the preform 46 before the arbor engages the inside diameter of the preform. During the die closing action, the stem 46 of the bushing is reversely extruded, and anti turn lugs 62 are coined while the tower 96 is forwardly extruded to completely finish the bushing 64 with tapered or conical inner wall 99, as in FIG. 6, so that it is ready for installation into the battery cover and onto the terminal post, as in FIG. 7.

When stripping the cold formed part from the upper die assembly, an actuator 168 is stroked downwardly to push three contact pins 170 (only two shown) downwardly, the ends of which contact the head of the stripper and pushes it downwardly to compressively load the spring 164. The cylindrical stripper engages the end of the stem of the bushing to eject the bushing completely from the upper die assembly as shown by FIG. 10.

Figure 12:
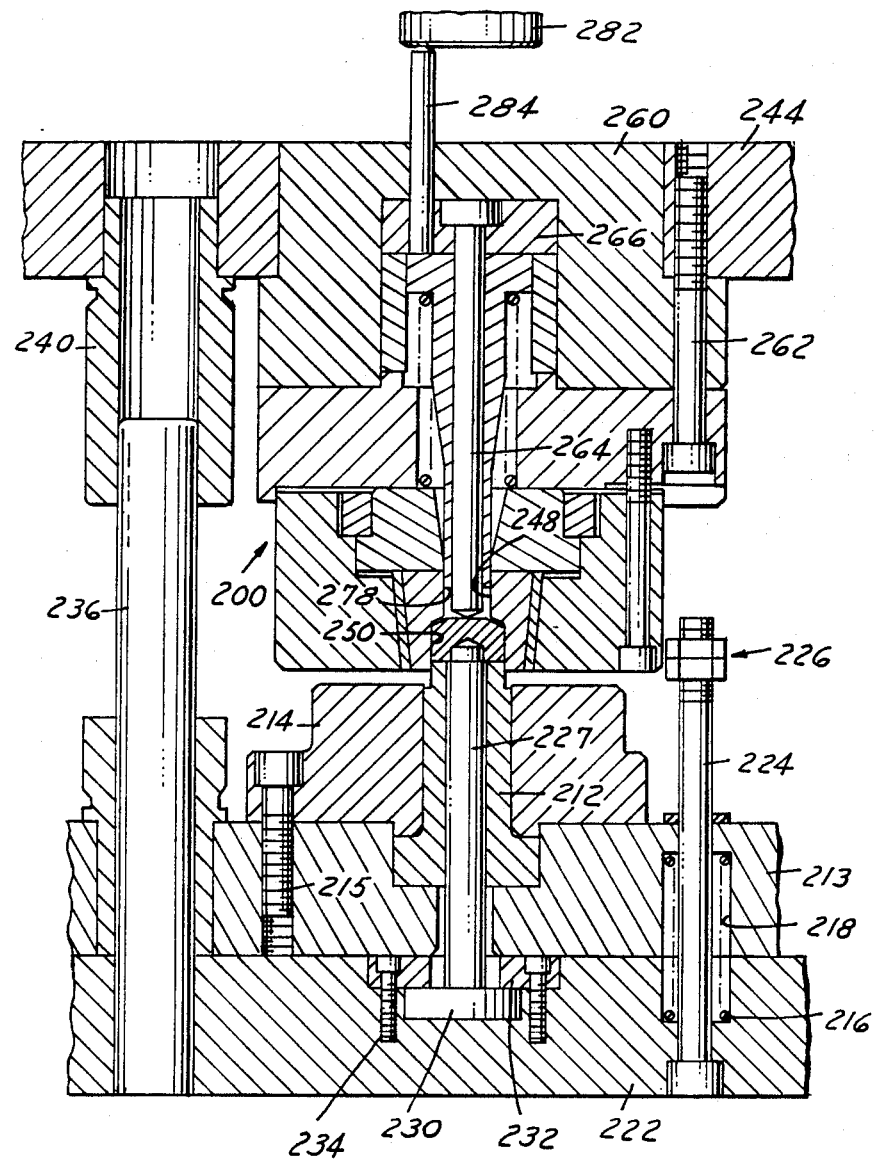
Figure 13:
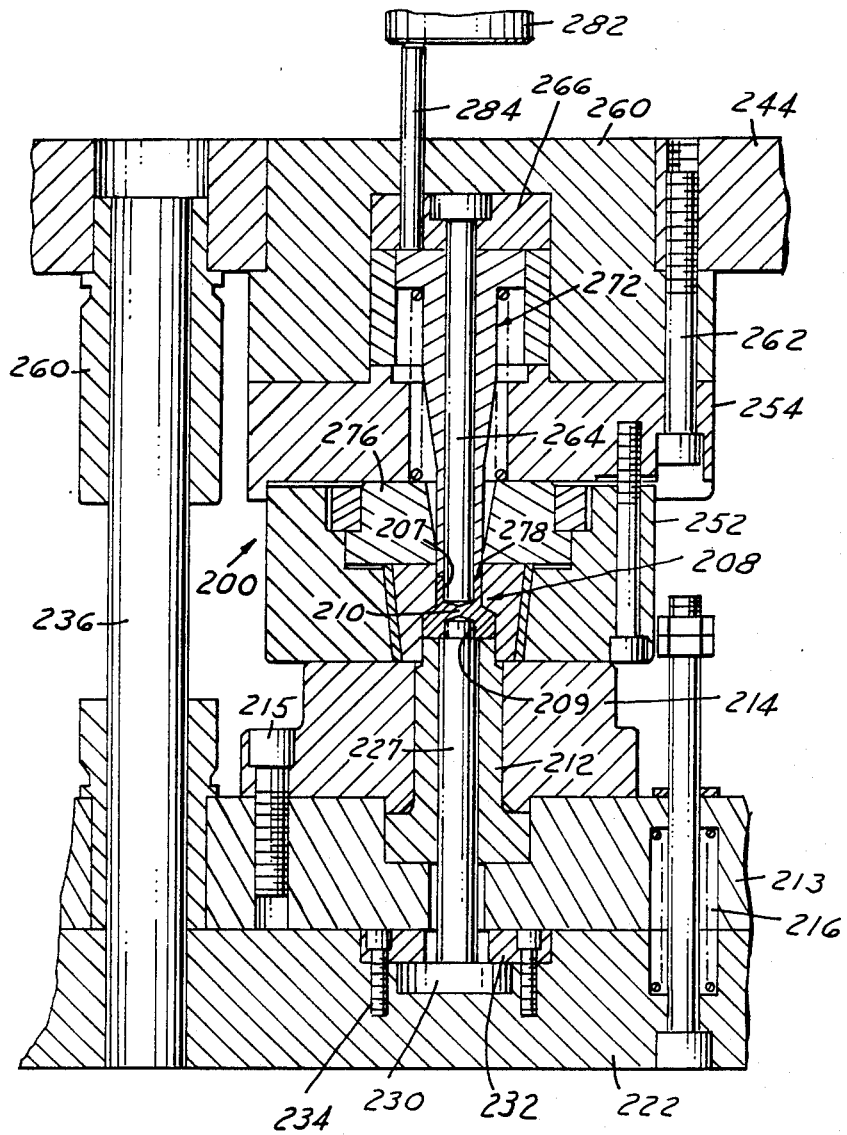

FIGS. 11 through 13 show another preferred compound die set 200 having upper and lower die assemblies 202 and 204 for cold forming a cylindrical lead alloy blank 206 of a predetermined mass into a shaped preform 208 shown in FIG. 13. Preform 208 is similar to preform 42 of FIG. 1A but has a centralized diametral web 210 separating the indentations or depressions 207, 209 cold formed by die set tooling. The mass of the preform 208 is greater than that of preform 42 by the amount of web mass which is removed by simple tooling prior to finish forming.

Initially, the blank 206 is mounted into a cylindrical bore of a die element 212 of the lower die assembly that is secured to a supporting cushion plate 213 by holder block 214 which is fastened to the cushion plate 213 by screws 215. Cushion plate 213 is supported by cushion springs exampled by helical spring 216 having an upper end mounted in pocket 218 in the cushion plate and a lower end mounted in pocket 220 of bolster plate 222 which is supported by the bed of the die operating press. The cushion spring 216 surrounds connector bolts 224 that extend through bolt openings in the support and bolster plates. Hex nuts and flat washers on the upper end of the bolts 224 provide the upper stop 226 for the support plate which is urged upwardly into the stop by the force of the cushion springs 216.

Extending upwardly from the bolster plate 222 is an arbor end square punch 227 which projects into the central bore of the die element 212 and into supporting contact with the lower end of the cylindrical blank 206. The lower end of this punch has an enlarged cylindrical head 230 secured in a corresponding opening and the bolster plate by a washer-like mounting ring 232 and screws 234.

An upright guidepost 236 extends from connection with the bolster plate 222 through supporting guide bushing 238 that is secured to the cushion plate 213 and into an upper guide bushing 240 fixed within an opening 242 extending through punch shoe 244 which is attached to the press ram.

The upper die assembly 202 has a cold forming die 246 at the working end thereof with cylindrical die cavities or openings 248 and 250 therein joined by a tapered annular shoulder 251 as shown in FIGS. 11 through 13.

The die 246 is mounted within a die holder 252 that is fastened to an intermediate connector block 254 by screws 256. In turn, the connector block 254 is secured to a center post 260 and to the punch shoe by screws 262.

The center post carries an elongated cylindrical center punch or arbor 264 which extends axially through mounting plate 266 in the center post into the cylindrical die cavities 248 and 250. This mounting ring is held in position by a cylindrical spacer 268 that is mounted on top of an annular mounting shoulder 253 of the spacer block 254. The cylindrical spacer 268 has a stroking chamber 274 for the cylindrical head 270 of a vertically movable part stripper 272, the elongated barrel of which surrounds the center punch 264 and extends through a central opening in the connector block 254 and a stripper guide block 276. The part stripper terminates in an annular end 278 providing the upper end of the die opening 248 to limit the flow of the metallic material of the blank 206 and thereby establish the limit of the stem of preform 208 when the die is stroked to the FIG. 13 position. Helical spring 280 seated on top of the stripper guide block extends upwardly around the barrel of the stripper into contact with the head 270 to provide the spring force to move the stripper to the up and retracted position. An actuator 282 has three sliding rods 284 (only one shown) that slide through the center post 260 and the plate 266 into engagement with the head of the stripper. When the die is opened, and on movement of the rods 284 downwardly by the actuator 282, the stripper is urged downwardly to remove the preform from the upper die assembly 202 when it is opened and moved vertically from the FIG. 13 position.

For loading, the upper and lower die assemblies are relatively moved in an axial direction by the press to an open position not illustrated. After the cylindrical blank has been loaded into the die set 200, the dies are moved to the position shown in FIG. 11 established by the contact member 285 extending downwardly from the punch shoe into contact with the head 286 of the movable stop pin 287 held in the stop position by resilient belleville spring washers 289 and mounted for axial movement through cushion plate 213. The upper die is stroked to the FIG. 12 position in which the donut-shaped preform is being made. On continuance of the die movement to the FIG. 13 position, the stem of the preform 208 has been extruded reversely and the upper punch 264 enters the preform to approach the lower punch 227 so that the web 210 is formed.

After the preformed element is cold formed by the powered movement of the upper die set into the position shown by FIG. 13, the upper die assembly is raised and sufficiently cleared of the lower die assembly and the preform 208 is ejected from the die set. The web 210 is then punched out by suitable tooling to complete the cylindrical opening and subtract a given mass from the preform so that it corresponds to preform 42 of FIG. 1A.

Figure 14:
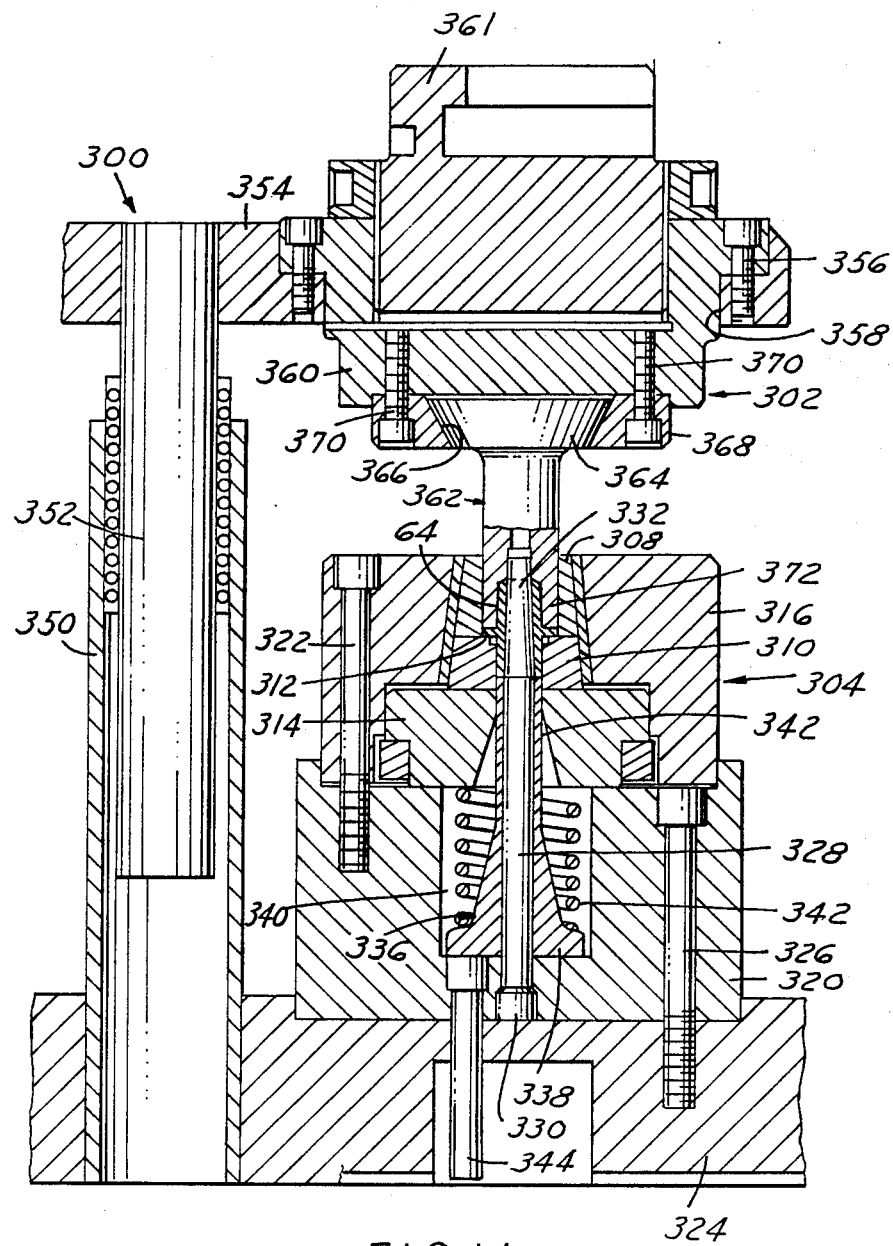
FIG. 14 is a cross-sectional view of a finishing die set for cold forming a finished bushing from the preform produced by the die set of FIGS. 11, 12 and 13.

The preform 42 is then loaded into the compound die set 300 of FIG. 14 having upper die assembly 302 movable between open and closed positions with respect to lower die assembly 304.

The lower die assembly 304 has top and bottom die blocks 308 and 310 stacked to form a die cavity 312 which is configured to form the anti-turn lugs and the outer surface of the stem portion 46 of terminal bushing 64. The stacked die blocks 308 and 310 are supported by a part ejector guide block 314. The die and guide blocks are held in operative position by die block holder 316 secured to a center post 320 by screw 322. The center post 320 is mounted to a bolster plate 324 by screw 326. In addition to the forming dies 308 and 310, the lower die assembly incorporates an upstanding and generally cylindrical arbor 328 which extends from its mounting by headed end 330 in the center post 320 to a tapered upper end 332 which is axially within the die cavity 312 to form a die surface so that the inner wall of the bushing cold formed thereon is tapered to slidably and snugly fit over the tapered end of the battery post 103 shown in FIG. 7.

A part ejector 336 is mounted for vertical movement in the lower die assembly and has headed portion 338 housed within a cavity 340 in the center post and a cylindrical ejector portion 342 extending from the head portion and around the arbor 328 into the lower die block 310 to form the lower end of die cavity 312. Helical spring 342 in cavity 340 urges the ejector to its down or retracted position. Three ejector pins 344 (only one shown) extend through the plate 324 and center post 320 to contact the lower side of the head 338 of the ejector so that the cold formed part or bushing 64 can be ejected from the die when open.

The upper die assembly 302 is supported for linear movement between the closed position of FIG. 14 in which bushing 64 is cold formed and an open position in which the lower die is cleared and the cold formed bushing can be ejected. Guide sleeve 350 is mounted to the bolster plate 324 and telescopic- ally receives a cylindrical guide post 352 depending from punch shoe 354. Secured by screws 356 within shoulder opening 358 in the punch shoe 354 is a mounting block 360 which is connected to a pneumatic or hydraulic actuator by adaptor 361 secured thereto. An elongated cylindrical punch 362 has an uppermost and tapered head 364 which fits into a corresponding tapered opening 366 provided by the retainer ring 368 that is removably secured to mounting block 360 by screws 370. By this holding means, the punch shoe 362 can be interchanged or replaced by another shoe having a different cavity for cold forming another size bushing. For example, a bushing of a smaller size may be produced with a replacement punch shoe with a smaller die cavity so that positive and negative posts having different sizes can be cold formed by the same machinery.

The inner forming walls 372 of the punch shoe 362 conforms to the conical outer shape of the bushing tower and the upper end of this wall is radius inwardly to meet with the upper end of the arbor to limit the extent of the reverse extrusion of preform metal when the die is stroked to the FIG. 14 position. This positively limits the height of the tower and the lower end of the stem limited by the ejector. Any excess material is forced into the portion of the die cavity forming the flange (i.e., a now critically dimensioned portion of the bushing 64). Such excess material may increase the vertical height of the flange by forcing the punch shoe upward against the hydraulic force of the die actuator. Accordingly, with the present invention, the bushing is completely cold formed by simultaneous reverse and forward extrusion and with anti-turn lugs being coined in the lower portion of the flange having a predetermined and fixed radius.

The mass of the finished bushing is substantially the same as that of the preform that was loaded into the die assembly 300. This bushing is a precision formed part which meets specifications for immediate installation (i.e., without additional sizing) into a battery cover where it is spun over to connect the bushing to the cover. The cover is then inserted onto the terminal posts such that the tops thereof are co-planar so that they can be fused together by a conventional welding operation to provide a finely finished battery. Since bushing porosity has been substantially eliminated, there can be no leakage or flow through the bushings so that the part rejection has been eliminated.

With the preferred cold working of the material to form the donut and with subsequent cold working operation by the dies to produce the stemmed preform, a bushing is completed by the cold forming process and dies described above which sets new standards for minimized porosity and maximized strength with precise dimensions as it comes from the dies without further operation for completion.

The detailed description and drawings are illustrative of the preferred embodiments and processes of this invention which may be modified in accordance with specific needs and circumstances The scope of the invention is therefore not to be limited by the particular description and drawing of such but by the following claims.

The embodiments of the invention in which an exclusive property or privilege is claimed are defined as follows:

1. A process of cold forming a metallic preform into a finished bushing having a central opening and an annular mounting flange lying between a lower stem and an upper tower for use as a terminal for a battery comprising the steps of:
   providing a blank of electrically conductive material with a predetermined mass;
   cold forming said blank into a generally cylindrical work part with at least one cylindrical portion between the ends thereof having an outer diameter which equals the diameter of said flange portion of said finished bushing;
   making an opening through said workpart along the central axis thereof so as to provide said workpart with a predetermined remainder mass;
   cold working said workpart so as to extrude in one direction a generally cylindrical stem joined to said cylindrical portion and having a diameter less than said cylindrical portion to complete said preform; and
   cold forming said cylindrical portion of said preform to extrude an annular tower in a second direction opposite to said first direction, said tower being reduced in diameter with respect to said cylindrical portion and to establish said cylindrical portion as said annular mounting flange between said stem and said tower and to thereby finish said bushing with a mass equal to said remainder mass.

2. The process of claim 1 and further including the coining of arcuately spaced lugs on a lower surface of said flange portion as said stem is shaped and said tower extruded.

3. A process of making a finished bushing with an annular mounting flange for use as a terminal for a battery comprising the steps of:
   providing a blank of electrically conductive material with a predetermined mass;
   cold forming said blank into a formed, generally cylindrical work part with at least one portion between the ends thereof having an outer diameter which corresponds to the diameter of said flange of said finished bushing;
   removing a predetermined mass from a center portion of said blank so that said blank has an opening therethrough and a predetermined remainder mass;
   cold forming said workpart to provide a generally cylindrical stem portion reduced in diameter with respect to said one portion and projecting from one end of said workpart;

cold forming said workpart to provide an annular external connection portion reduced in diameter with respect to said one portion and projecting from the opposite end of said workpart from said stem and such to establish said one portion as an annular mounting flange between said stem portion and said connector portion and to finish cold forming said bushing with a mass equal to said remainder mass.

4. A process of making a battery terminal bushing substantially to size, said bushing comprising an upstanding tower portion adapted for fusion to a terminal post extending therein from the innards of said battery, said tower portion having a predetermined shape and dimension, a stem portion axially aligned with said tower portion and adapted to mate with an opening in a wall of the battery container, said stem portion having a predetermined shape and dimension, an annular mounting flange intermediate said tower and stem portions for engaging said wall immediately surrounding said opening, said flange having a predetermined outside diameter, and a bore extending through said aligned tower and stem portions, said bore having a predetermined inside configuration adapted to fit onto said post, said method comprising:

providing a lead based blank having a predetermined mass;

cold forming said blank into a workpiece having a first generally cylindrical portion between the ends thereof having an outer diameter which substantially equals said predetermined outside diameter of said flange, a second generally cylindrical portion extending from said first portion and having an outside diameter which is less than said predetermined outside diameter, and a depression in each of said ends of said cylindrical portions axially aligned one with the other, said workpiece having a web separating said depressions from each other;

removing said web from between said axially aligned depressions so as to provide a workpiece having a continuous opening therethrough and a remainder mass less than said predetermined mass;

cold forming said workpiece about an arbor conforming to the shape of said bore and extending through said opening to commence shaping said first and second cylindrical portions into said flange and stem portions respectively, said cold forming being such as to cause said second cylindrical portion to flow in a first direction normal to the principal plane of said flange; and thereafter, further cold forming said workpiece about said arbor to finish shaping said flange and stem portions and form said tower and to provide a finished bushing having a mass equal to said remainder mass, said further cold forming being such as to cause said first cylindrical portion to flow in a second direction opposite said first direction.

5. The process according to claim 4 wherein said second cylindrical portion is extruded backwardly along said arbor and said tower portion is extruded forwardly along said arbor.

6. The process according to claim 4 wherein said blank is expanded radially outwardly to form said first generally cylindrical portion and thereafter extruded backwardly about said arbor to form said second generally cylindrical portion.

7. The process according to claim 6 wherein said second cylindrical portion is extruded backwardly along said arbor and said first cylindrical portion is extruded forwardly along said arbor.

* * * * *